(12) United States Patent
Bierle et al.

(10) Patent No.: US 7,204,967 B2
(45) Date of Patent: Apr. 17, 2007

(54) WASTE WATER PROCESS WITH SCRUBBER

(76) Inventors: Scott A. Bierle, 1401 Spring Farms Pl., Carlsbad, NM (US) 88220; Richard Neylon, 15401 N. 110th St., Scottsdale, AZ (US) 85259; Allen D. Bierle, 1519 Desert Willow Dr., Carlsbad, NM (US) 88220

( * ) Notice: Subject to any disclaimer, the term of this patent is extended or adjusted under 35 U.S.C. 154(b) by 0 days.

(21) Appl. No.: 11/234,052

(22) Filed: Sep. 23, 2005

(65) Prior Publication Data

US 2007/0048212 A1    Mar. 1, 2007

Related U.S. Application Data

(60) Provisional application No. 60/711,575, filed on Aug. 26, 2005.

(51) Int. Cl.
*C01C 1/20* (2006.01)
*C02F 1/00* (2006.01)
*C02F 1/58* (2006.01)

(52) U.S. Cl. .............. 423/220; 423/234; 423/237; 423/238; 210/150; 210/151; 210/767

(58) Field of Classification Search .......... 423/237, 423/238, 220, 234; 210/767, 150, 151
See application file for complete search history.

(56) References Cited

U.S. PATENT DOCUMENTS

| 3,431,070 | A |  | 3/1969 | Keller |
| 3,987,154 | A |  | 10/1976 | Lagas |
| 4,002,565 | A |  | 1/1977 | Farrell et al. |
| 4,009,243 | A |  | 2/1977 | Weber et al. |
| 4,253,928 | A |  | 3/1981 | Blytas et al. |
| 4,395,390 | A |  | 7/1983 | Desgrandchamps et al. |
| 4,414,103 | A |  | 11/1983 | Farrell |
| 4,486,299 | A |  | 12/1984 | Kettinger |
| 4,518,572 | A |  | 5/1985 | Ritter |
| 4,547,293 | A |  | 10/1985 | King et al. |
| 4,693,883 | A |  | 9/1987 | Fleming |
| 4,778,490 | A |  | 10/1988 | Pollert |
| 4,784,775 | A |  | 11/1988 | Hardison |
| 5,139,764 | A |  | 8/1992 | Szekely |
| 5,286,389 | A |  | 2/1994 | Hardison |
| 5,672,326 | A | * | 9/1997 | Minak et al. .............. 423/224 |
| 6,902,713 | B1 | * | 6/2005 | Binoist et al. .............. 423/237 |
| 2002/0134567 | A1 |  | 9/2002 | Rasmussen et al. |

OTHER PUBLICATIONS

Lee et al., Optimization of $H_2S$ and $NH_3$ Absorption Condition to Minimize $CO_2$ Absorption in a Water-Wash Process, *Environment and Energy Research Center, RIST*; published on or before Oct. 15, 1999.

* cited by examiner

*Primary Examiner*—Timothy C. Vanoy
(74) *Attorney, Agent, or Firm*—Pauley Peterson & Erickson

(57) ABSTRACT

An apparatus and method for treating waste products produced by chemical processing plants. Steam stripping waste sour water results in a vapor including ammonia and hydrogen sulfide. A scrubber unit including a quenching column produces a concentrated ammonium sulfide solution. The concentrated ammonium sulfide allows for more efficient transfer from more than one refinery to a centralized purification facility for further processing.

19 Claims, 2 Drawing Sheets

WASTE WATER PROCESS WITH SCRUBBER

CROSS REFERENCE TO RELATED APPLICATION

This patent application claims the benefit of U.S. Provisional Application No. 60/711,575, filed 26 Aug. 2005.

This application claims priority to Provisional U.S. Patent Application Ser. No. 60/711,575, filed on 26 Aug. 2005. The co-pending Provisional Patent Application is hereby incorporated by reference herein in its entirety and is made a part hereof, including but not limited to those portions which specifically appear hereinafter.

BACKGROUND OF THE INVENTION

This invention is directed to a method and apparatus for removing byproducts, such as ammonia and hydrogen sulfide, from waste water streams produced by chemical processing plants, such as oil refineries or coking operations.

Aqueous waste water streams produced in the oil refining industry generally include nitrogen and sulfur contaminants. The waste water streams typically contain about 1 to 3% ammonia, and an equivalent or greater concentration of acid gas (i.e., hydrogen sulfide). Many oil refineries treat this aqueous waste water by steam stripping the waste water, producing a vapor stream containing water, ammonia and hydrogen sulfide, and feeding this vapor to a sulfur recovery unit (SRU).

There is a need for a method for more efficient removal and processing of byproducts from waste water streams. There is also a need for a method for removal and processing of byproducts using economies of scale, allowing for processing of the byproduct material(s) from one or more plants at a remote facility.

SUMMARY OF THE INVENTION

A general object of the invention is to provide a method and apparatus for treating waste products produced by chemical processing plants.

A more specific objective of the invention is to overcome one or more of the problems described above.

The general object of the invention can be attained, at least in part, through a method for treating waste products produced by chemical processing plants. The method obtains from the chemical processing plant a waste liquid including ammonia and hydrogen sulfide and steam strips the waste liquid to produce a vapor stream including water, the ammonia and the hydrogen sulfide. The ammonia and the hydrogen sulfide in the vapor stream react to provide ammonium sulfide which is collected.

The invention further comprehends a method for treating waste products produced by chemical processing plants. The method includes obtaining a vapor stream including water, ammonia and hydrogen sulfide. The vapor stream is cooled and the ammonia and the hydrogen sulfide in the vapor stream react to obtain ammonium sulfide. An ammonium sulfide solution is formed and collected.

The invention still further comprehends a method for treating waste products produced by chemical processing plants. A packed bed column is provided that includes a first stage including a first heat exchanger, a second stage including a second heat exchanger, and a third stage for introducing water into the column. A vapor stream including water, ammonia and hydrogen sulfide is introduced into the packed bed column. The vapor stream is cooled to a first temperature in the first stage of the column. The vapor stream is cooled to a second temperature that is lower than the first temperature in the second stage of the column. Water is introduced into the third stage of the column. The ammonia and the hydrogen sulfide react in the vapor stream to obtain ammonium sulfide. An ammonium sulfide solution including the water and the ammonium sulfide is formed and collected.

In the method of this invention the vapor stream resulting from steam stripping sour water is processed in a multi-stage "scrubber" to produce a concentrated (e.g., 50%) ammonium sulfide solution. The ammonium sulfide solution is transferred to a purification facility and used as a raw material feed to produce separate purified streams of ammonia and hydrogen sulfide. Treating the vapor rather than the wastewater itself provides several benefits. Specifically, the method does not require an additional 10% ammonia feed as used in some current methods for purifying sour water, due to varying ammonia concentrations in the wastewater. Also, treating overhead gases rather than aqueous wastewater typically reduces the level of hydrocarbons contaminating the raw material feed, thereby further reducing the equipment needed (e.g., knockout pots) to purify final ammonia and hydrogen sulfide products.

These and other objects and features of this invention will be better understood from the following detailed description taken in conjunction with the drawings.

DEFINITIONS

Within the context of this specification, each term or phrase below will include the following meaning or meanings.

As used herein, "chemical processing plant" refers to any plant that manufactures or processes chemicals or petrochemicals, including but not limited to oil refineries.

As used herein, "purification facility" refers to a plant or other facility that processes chemicals or chemical reaction byproducts to distill, separate or otherwise produce desired chemical products from undesirable chemical compounds.

As used herein, "steam stripping" refers to a process that removes byproducts, such as ammonia and hydrogen sulfide, along with a portion of water from a waste water stream. A "steam stripper" or "stripper" is a processing unit or column that performs a steam stripping process. Such steam strippers are also referred to as recycled sour water strippers in refinery applications.

As used herein, "scrubber" refers to a processing unit that produces a condensate from a vapor stream that includes undesirable byproducts.

As used herein, "sour water" refers to a liquid waste product produced as a byproduct of chemical, and more typically petrochemical, processing.

DESCRIPTION OF PREFERRED EMBODIMENTS

This invention provides a method for treating a waste product(s) from one or more chemical processing plants. The method of this invention provides efficiency and decreased cost to chemical processing plants by allowing for remote site purification and/or processing of waste products. The method of this invention can benefit chemical processing plants by increasing the efficiency of on-site waste processing units, such as, for example, sulfur plants, or by eliminating the need for on-site purification facilities. The method of this invention forms a concentrate that includes at least one byproduct and/or a compound of or including the byproduct. The concentrate from one or more plants can be more easily and cost effectively transported to a remote purification facility for treatment and/or further processing.

Figure 1:
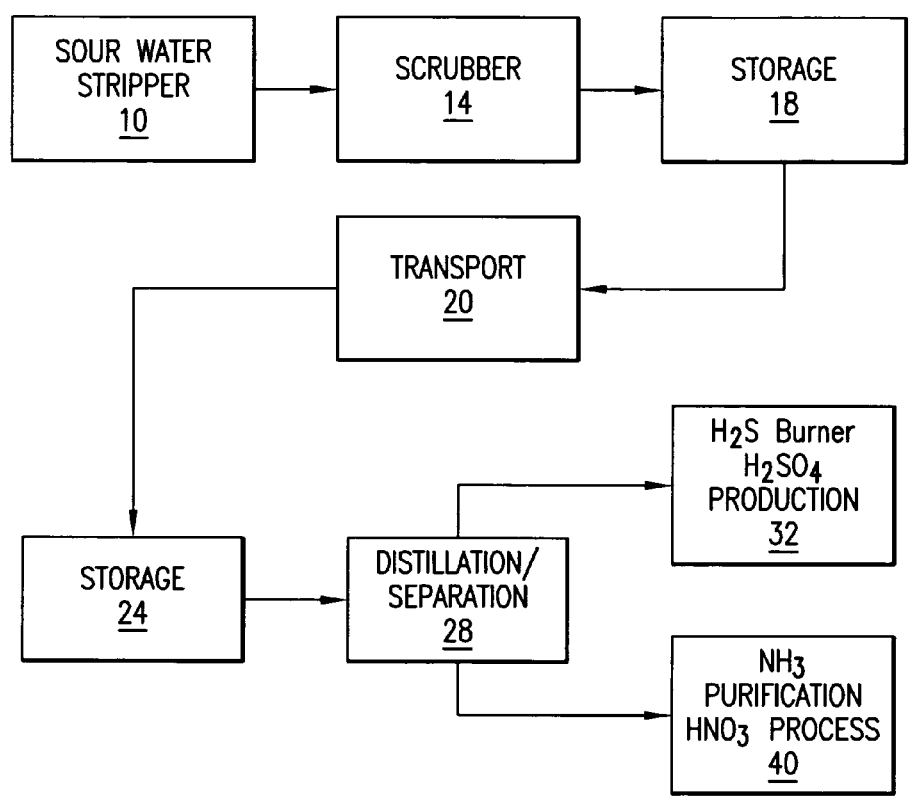
FIG. 1 is a flow diagram illustrating a method according to one embodiment of this invention.

FIG. 1 is a flow diagram illustrating the method according to one embodiment of this invention. In FIG. 1, a chemical processing plant includes a sour water stripper 10, a scrubber 14 and a storage facility 18. The chemical processing plant, such as a refinery, produces a byproduct that is contained in or embodied as a liquid waste product. Without intending to be so limited, the liquid waste product will be described below referring to sour water including as byproducts ammonia and hydrogen sulfide. In one embodiment of this invention, the sour water includes a concentration of ammonia of about 5% or less, and typically about 1% to about 3%, and an equivalent or greater concentration of hydrogen sulfide.

The sour water is steam stripped in the sour water stripper 10. The result is a vapor stream including water, ammonia and hydrogen sulfide, all in a vapor or gas form. The steam stripping of the sour water can occur by any means known and available in the art for steam stripping a liquid. Such steam stripping processes are generally common at refineries to produce a gas for processing at on-site sulfur plants (e.g., sulfur recovery units).

The vapor stream from the stripper 10 is introduced into the scrubber 14. The scrubber 14, which can include one or more packed bed columns such as described below, forms a concentrate from the vapor stream. The concentrate includes one or more of the byproducts and/or a compound of the byproducts. In the embodiment of FIG. 1, the condensate is a concentrated ammonium sulfide solution. The concentrated ammonium sulfide solution desirably includes an ammonium sulfide concentration of at least about 40% by weight, and more desirably about 45% to about 55% by weight.

The concentrated ammonium sulfide solution is collected from the scrubber and stored in the storage facility 18, e.g., a storage tank. The concentrated ammonium sulfide solution remains in the storage facility 18 until the concentrated ammonium sulfide solution is delivered to a further storage facility 24 at a remote or off-site purification facility. The concentrated ammonium sulfide solution is delivered by a transport 20, which can be any transporting means such as a truck, train, pipeline and/or barge or ocean freighter. The resulting increase in byproduct concentration in the concentrate over the original waste liquid allows for more cost efficient transportation for delivering a relatively low-priced commodity to a remote purification facility.

As discussed herein, the concentrate is in a liquid form. However, it is not intended to be so limited. The concentrate can be stored and delivered in a solid form or as wet sludge. As will be appreciated by those skilled in the art following the teachings herein provided, a liquid concentrate typically allows for relatively easier and safer handling and moving, thereby making a liquid the preferred form for storing and transporting. In addition, the liquid form eliminates the need for additional handling equipment such as centrifuges, dryers, solids handling and packaging.

The purification facility is ideally suited to refine the byproducts and manufacture and market desirable commodities from the byproducts through the use of available technology. In the embodiment shown in FIG. 1, the purification facility includes a distillation and/or separation unit 28 for separating the ammonium sulfide into ammonia and hydrogen sulfide. The hydrogen sulfide is introduced to a hydrogen sulfide burner 32 to produce sulfuric acid ($H_2SO_4$), or another useful chemical. Alternatively, the hydrogen sulfide gas can be purified and used as a raw material for producing desirable chemical products, such as, for example, methionine, mercaptans, hydrosulfides, other sulfides or natural gas odorants. The ammonia enters an ammonia purification unit 40 for forming nitric acid or other useful chemicals. Examples of technology or processes used at the purification facility include, without limitation, WWII waste water purification processes developed by Chevron Corporation, San Ramon, Calif.; the PHOSAM processes developed by United States Steel, LLC, Pittsburgh, Pa.; or the CLL technology of Sasol-Lurgi, Sasolburg, South Africa.

Figure 2:
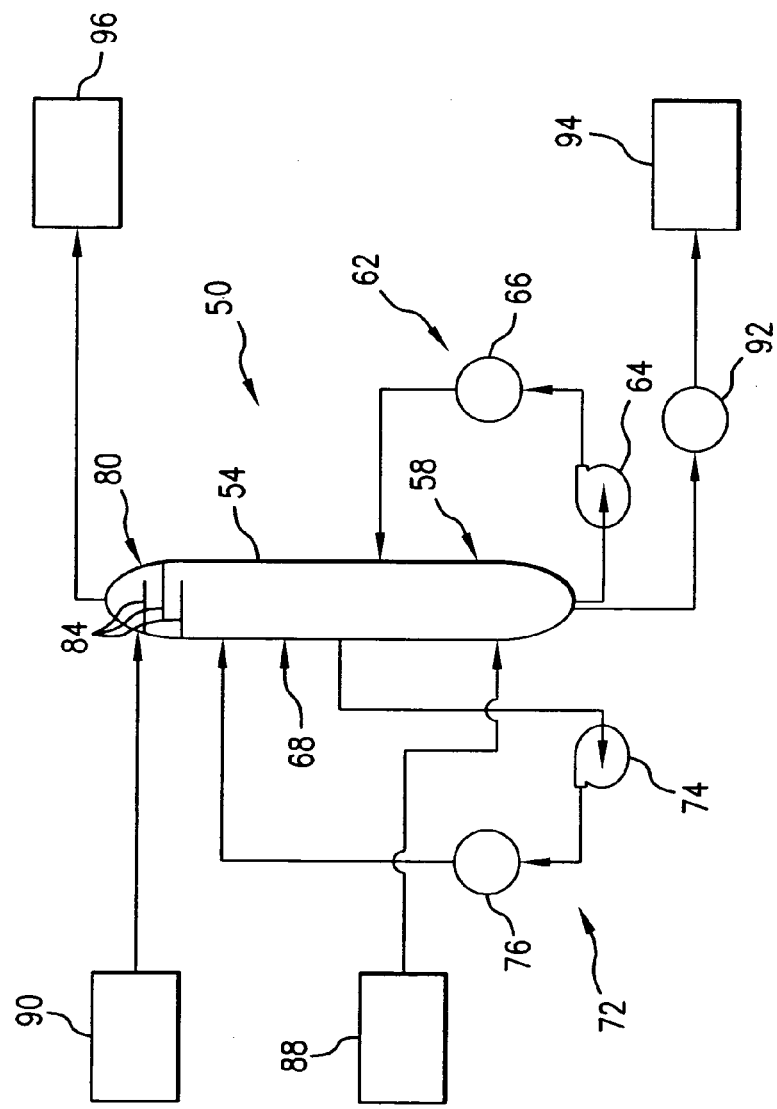
FIG. 2 is a general schematic illustrating a scrubber unit according to one embodiment of this invention.

FIG. 2 illustrates a scrubber unit 50 for use in the method of FIG. 1. The scrubber 50 includes a packed bed column 54. The "packed bed" refers to a random or stacked tower packing with gas injection packing support and liquid distributors, or an equivalent tower tray design to obtain the scrubbing stage requirements. The column 54 is a "three-stage" column; however, the three stages described below can also be accomplished using two or more columns, such as, for example, a separate column or unit for each of the three stages. The column 54 acts as a quench on the gas entering therein and produces the concentrated ammonium sulfide. The column 54 will desirably be highly temperature sensitive to achieve the desired ammonium sulfide concentration.

The column 54 includes a first stage or section, generally designated as first stage 58, which includes a packed bed in combination with a first external heat exchanger 62 including a first circulation pump 64 and a first cooling unit 66. The first stage can alternatively be provided by a separate, stand alone packed column. A second or middle stage 68 also includes a packed bed in combination with a second external heat exchanger 72 including a second circulation pump 74 and a second cooling unit 76. The second stage functions can also be performed by a separate, stand alone packed column. A third or last stage 80 follows the second stage 68. The third stage 80 includes three or more trays 84 for receiving water to serve as a final water scrubber for the ammonia in the gas.

A vapor stream including ammonia, hydrogen sulfide and water from a sour water steam stripper 88 enters near the bottom end of the column 54. The vapor stream travels up through the column 54, through the first stage 58, the second stage 68 and the third stage 80. In the first stage 54, the concentrated ammonium sulfide is circulated through the heat exchanger 62 and is cooled with cooling water that is circulated on an opposite side of the heat exchanger 62. The concentrated ammonium sulfide is then returned to the first stage 58 of the column 54 where the cooled solution is again contacted with the vapor stream that is traveling up the column. The packed bed provides the necessary contact between the vapor stream and the concentrated ammonium sulfide solution to obtain the desired cooling of the vapor stream, and reaction of the ammonia and hydrogen sulfide gases. In one embodiment of this invention, the vapor stream is cooled from about 80–95° C. to about 35–40° C. in the first stage 58.

Ammonium sulfide is produced according to the method of this invention by reacting two moles of ammonia with one mole of hydrogen sulfide within the column 54. A side reaction in the production of ammonium sulfide is the production of ammonium bisulfide and ammonium hydroxide. The following chemical equations express the production of an ammonium sulfide solution according to one embodiment of this invention.

$$2NH_3 + H_2S \rightarrow (NH_4)_2S$$

$$2NH_3 + H_2S + H_2O \rightarrow NH_4HS + NH_4OH$$

The cooled vapor continues into the second stage where it is further cooled by a weaker ammonium sulfide solution that is cooled through heat exchanger 72 with cooling water. The weak ammonium sulfide solution is circulated from the bottom of the second stage 68 to the top of the second stage 68 down. Some of the weak ammonium sulfide solution is sent to the first stage 58 either by overflow or level control to maintain a proper level. Additional reaction of the ammonia and the hydrogen sulfide to form an ammonium sulfide compound occurs in the second stage 68. In one embodiment of this invention, the temperature of the second stage 68 is maintained at about 34° C. (about 93° F.) or less.

The vapor stream from the second stage 68 proceeds to the third stage 80. In the third stage 80, water from a water source 90 enters near the top of the column 54 and on the top tray 84. The trays 84 act to ensure a direct contact between the water and the vapors from the second stage 68. The third stage 80 desirably serves as the final ammonia absorption or reaction stage. The water moves down the column 54 to dilute the resulting ammonium sulfide and wash it out the bottom of the column in a concentrated ammonium sulfide solution. The water also acts to reduce, and desirably substantially remove, the ammonia vapor in the vapor stream. The resulting concentrated ammonium sulfide solution is optionally further cooled by product cooler 92 and collected and stored in storage facility 94

Any remaining hydrogen sulfide gas, due to a stoichiometrical excess of hydrogen sulfide in the vapor stream, is vented from the column 54 and transferred to a sulfur plant 96, such as a sulfur recovery unit, for further processing and/or incineration. A pressure controller (not shown) desirably controls the gas exiting the column 54 to maintain the desired pressure in or on the column 54. The method and apparatus of this invention produce a hydrogen sulfide gas that is relatively more efficient for further processing, due to the removal of most or desirably all of the ammonia and the water vapor. As ammonia requires a higher incineration temperature, the removal of the ammonia from the vapor stream lowers the necessary incineration temperature at the sulfur plant 96. Removing the water from the vapor stream further provides for more efficient hydrogen sulfide gas processing at the sulfur plant 96.

Thus, the invention provides a method for recovering ammonia and hydrogen sulfide from a vapor stream resulting from the sour water stripping processes currently practiced at many refineries. The concentrated ammonium sulfide solution reduces the cost of transportation, such that the byproducts from one or more refineries can be transported to a remote purification facility for processing. Also, the method of this invention removes ammonia from the waste stream, which consumes more oxygen than sulfur during processing/incineration, thereby freeing up capacity at the sulfur plant. By increasing the sulfur capacity, refiners can purchase less expensive crude oil having higher amounts of ammonia and sulfides. Additional benefits to, for example, an oil refiner by absorbing ammonia and hydrogen sulfide from the sour water stripper vapor include reduced $NO_x$, energy savings (e.g., incinerator costs), improved operation and catalyst life expectancy, reduced corrosion and heat transfer equipment and a reduced need for oxygen enrichment. The scrubber technology of this invention can be implemented at many refineries, which already use steam stripping to produce water vapor from sour water.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A method for treating waste products produced by chemical processing plants, the method comprising:
    obtaining from the chemical processing plant a waste liquid including ammonia and hydrogen sulfide;
    steam stripping the waste liquid to produce a vapor stream including water, the ammonia and the hydrogen sulfide;
    reacting the ammonia and the hydrogen sulfide in the vapor stream to provide ammonium sulfide; and
    collecting the ammonium sulfide in the vapor stream in a concentrated ammonium sulfide solution.

2. The method of claim 1, wherein reacting the ammonia and the hydrogen sulfide comprises:
    introducing the vapor stream into a packed bed column; and
    cooling the vapor stream within the packed bed column.

3. The method of claim 2, wherein the packed bed column comprises a three-stage packed bed column.

4. The method of claim 1, wherein the waste liquid comprises an ammonia concentration of less than about 5% by weight.

5. The method of claim 1, wherein the concentrated ammonium sulfide solution comprises an ammonium sulfide concentration of at least about 40% by weight.

6. The method of claim 1, wherein the concentrated ammonium sulfide solution comprises an ammonium sulfide concentration of about 45%–55% by weight.

7. The method of claim 1, wherein the chemical processing plant comprises an oil refinery.

8. A method for treating waste products produced by chemical processing plants, the method comprising:
    obtaining from the chemical processing plant a waste liquid including ammonia and hydrogen sulfide;
    producing a vapor stream including water, the ammonia and the hydrogen sulfide from the waste liquid including the ammonia and the hydrogen sulfide;
    cooling the vapor stream;
    reacting the ammonia and the hydrogen sulfide in the vapor stream to obtain ammonium sulfide;
    collecting the ammonium sulfide in the vapor stream in a concentrated ammonium sulfide solution; and
    collecting the ammonium sulfide solution.

9. The method of claim 8, wherein the vapor stream is produced by steam stripping a waste liquid.

10. The method of claim 8, wherein cooling the vapor stream and reacting the ammonia and the hydrogen sulfide occurs in a packed bed column.

11. The method of claim 10, wherein the packed bed column comprises a three-stage packed bed column.

12. The method of claim 10, wherein forming an ammonium sulfide solution comprises introducing water into the packed bed column.

13. The method of claim 8, wherein the vapor stream comprises an ammonia concentration of less than about 5% by weight.

14. The method of claim 13, wherein the ammonium sulfide solution comprises an ammonium sulfide concentration of at least about 40% by weight.

15. The method of claim 13, wherein the ammonium sulfide solution comprises an ammonium sulfide concentration of about 45%–55% by weight.

16. A method for treating waste products produced by chemical processing plants, the method comprising:
   providing a packed bed column, the packed bed column comprising a first stage including a first heat exchanger, a second stage including a second heat exchanger, and a third stage for introducing water into the column;
   introducing a vapor stream including water, ammonia and hydrogen sulfide into the packed bed column;
   cooling the vapor stream to a first temperature in the first stage of the column;
   cooling the vapor stream to a second temperature lower than the first temperature in the second stage of the column;
   introducing water into the third stage of the column;
   reacting the ammonia and the hydrogen sulfide in the vapor stream to obtain ammonium sulfide and collecting the ammonium sulfide in the vapor stream in a concentrated ammonium sulfide solution; and
   collecting the ammonium sulfide solution.

17. The method of claim 16, wherein the vapor stream is obtained by steam stripping a waste liquid.

18. The method of claim 16, wherein the vapor stream comprises an ammonia concentration of less than about 5% by weight.

19. The method of claim 18, wherein the ammonium sulfide solution comprises an ammonium sulfide concentration of at least about 40% by weight.

* * * * *